United States Patent
Matsui et al.

(10) Patent No.: US 6,570,376 B2
(45) Date of Patent: May 27, 2003

(54) MAGNETIC ROTATIONAL ANGLE DETECTING APPARATUS

(75) Inventors: Kazuhito Matsui, Aichi-ken (JP); Masakata Kanbe, Aichi-ken (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 09/841,540

(22) Filed: Apr. 24, 2001

(65) Prior Publication Data

US 2001/0033231 A1 Oct. 25, 2001

(30) Foreign Application Priority Data

Apr. 25, 2000 (JP) .......................... 2000-124336

(51) Int. Cl.[7] .......................... G01D 5/243; G01D 5/16; G01B 7/30
(52) U.S. Cl. .......................... 324/207.21; 324/207.25; 324/207.22
(58) Field of Search .......................... 324/207.21, 207.25, 324/207.22, 207.2, 207.24, 235, 251, 252; 338/32 R; 341/15

(56) References Cited

U.S. PATENT DOCUMENTS

| | | | | |
|---|---|---|---|---|
| 4,053,829 A | * | 10/1977 | Maruo | 324/260 |
| 4,649,342 A | * | 3/1987 | Nakamura | 324/207.21 |
| 5,239,263 A | * | 8/1993 | Iwata et al. | 324/207.21 |
| 6,064,197 A | * | 5/2000 | Lochmann et al. | 324/207.21 |

* cited by examiner

*Primary Examiner*—Walter E. Snow
(74) *Attorney, Agent, or Firm*—Patterson, Thuente, Skaar, Christensen, LLC

(57) ABSTRACT

A detector for detecting a rotational angle of a gearshift lever. The detector includes a magnet that forms a magnetic flux in a predetermined direction along its surface. A magnetic resistance sensor generates a detection signal corresponding to the direction of the magnetic flux. The detected object is connected to the magnet or the magnetic resistance sensor. The magnet and the magnetic resistance sensor are rotated relatively to each other to generate the detection signal and obtain the rotational angle of the detected object. The magnetic resistance sensor is separated from an axis of rotation of the sensor or the magnet.

5 Claims, 4 Drawing Sheets

MAGNETIC ROTATIONAL ANGLE DETECTING APPARATUS

BACKGROUND OF THE INVENTION

The present invention relates to a rotational angle detector, and more particularly, to a rotational angle detector for detecting the rotational angle of, for example, a gearshift lever of an automobile.

FIG. 1 is a schematic front view showing a prior art rotational angle detector 50, and FIG. 2 is a cross-sectional view of the rotational angle detector 50.

The rotational angle detector 50 includes an annular magnet 51 rotated integrally with a gearshift lever (not shown). The magnet 51 is magnetized so that its magnetic flux extends in a direction perpendicular to the front and rear surfaces of the magnet 51. In other words, the magnet 51 is polarized in the axial direction of the magnet 51 (direction perpendicular to the plane of FIG. 2). Accordingly, the magnetic flux extends upward or downward with respect to the plane of FIG. 2 at locations near the front and rear surfaces of the magnet 51.

A magnetic resistance sensor 52 is arranged at a position corresponding to the center of the magnet 51 to detect direction changes of the magnetic flux of the magnet 51. When the gearshift lever is shifted and the magnet 51 is rotated by a predetermined angle, the magnetic resistance sensor 52 generates an analog output voltage in accordance with the direction of the magnetic flux, which changes in accordance with the rotational angle of the magnet 51. More specifically, referring to FIG. 3, the analog output voltage has a waveform that is generally a sine wave. The linear portion of the output voltage wave is the detection range of the gearshift lever rotational angle.

In the conventional rotational angle detector 50, the linear portion of the analog output voltage waveform (sine wave) output from the magnetic resistance sensor 52 is short. Thus, the detection range of the rotational angle is less than 90°. The conventional rotational angle detector 50 thus cannot be employed if a detection range of 90° or more is required. Further, since a shaft connected with the gearshift lever is inserted through the middle of the magnet 51, the positioning of the magnetic resistance sensor 52 along the axis of the magnet 51 is difficult.

SUMMARY OF THE INVENTION

It is an object of the present invention to provide a rotational angle detector that enlarges the detection range and facilitates the positioning of the magnetic resistance sensor.

To achieve the above object, in a first perspective, the present invention is a detector for detecting a rotational angle of a detected object. The detector includes a magnet having a surface. The magnet forms a magnetic flux in a predetermined direction along the surface. A magnetic resistance sensor generates a detection signal corresponding to the direction of the magnetic flux. The detected object is connected to one of the magnet and the magnetic resistance sensor, and the magnet and the magnetic resistance sensor are rotated relative to each other to generate the detection signal and obtain the rotational angle of the detected object. The magnetic resistance sensor is spaced from an axis of rotation of one of the sensor and the magnet.

In a further perspective, the present invention is a detector for detecting a rotational angle of a detected object. The detector includes an annular magnet for forming a magnetic flux parallel to a predetermined radial direction of the magnet. A magnetic resistance sensor generates a detection signal corresponding to the direction of the magnetic flux. The detected object is connected to one of the magnet and the magnetic resistance sensor, and the magnet and the magnetic resistance sensor are rotated relatively to each other to generate the detection signal and obtain the rotational angle of the detected object. The magnetic resistance sensor is separated from an axis of rotation of one of the sensor and the magnet.

In another perspective, the present invention is a detector for detecting a rotational angle of a detected object. The detector includes an annular magnet for forming a magnetic flux in a radial direction of the magnet. The magnet includes a first magnetic pole portion and a second magnetic pole portion located on the outer side of the first magnetic portion. The first magnetic pole portion has a north pole and a south pole, and the second magnetic pole portion has a south pole located in correspondence with the north pole of the first magnetic pole portion and a north pole located in correspondence with the south pole of the first magnetic pole portion. A magnetic resistance sensor generates a detection signal corresponding to the direction of the magnetic flux. The detected object is connected to one of the magnet and the magnetic resistance sensor, and the magnet and the magnetic resistance sensor are rotated relatively to each other to generate the detection signal and obtain the rotational angle of the detected object. The magnetic resistance sensor is separated from an axis of rotation of one of the sensor and the magnet.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
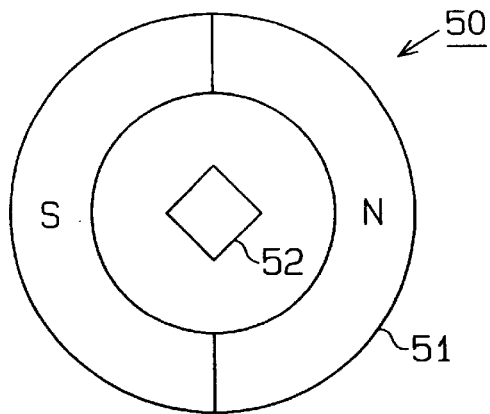
FIG. 1 is a schematic front view showing a prior art rotational angle detector.
Figure 2:
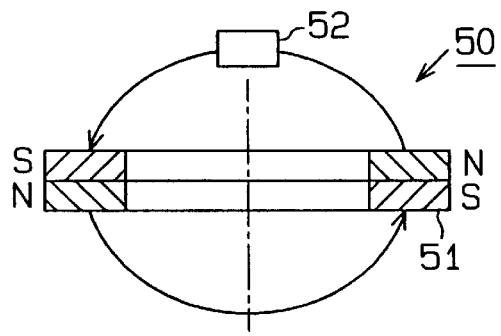
FIG. 2 is a cross-sectional view showing the rotational angle detector of FIG. 1.
Figure 3:
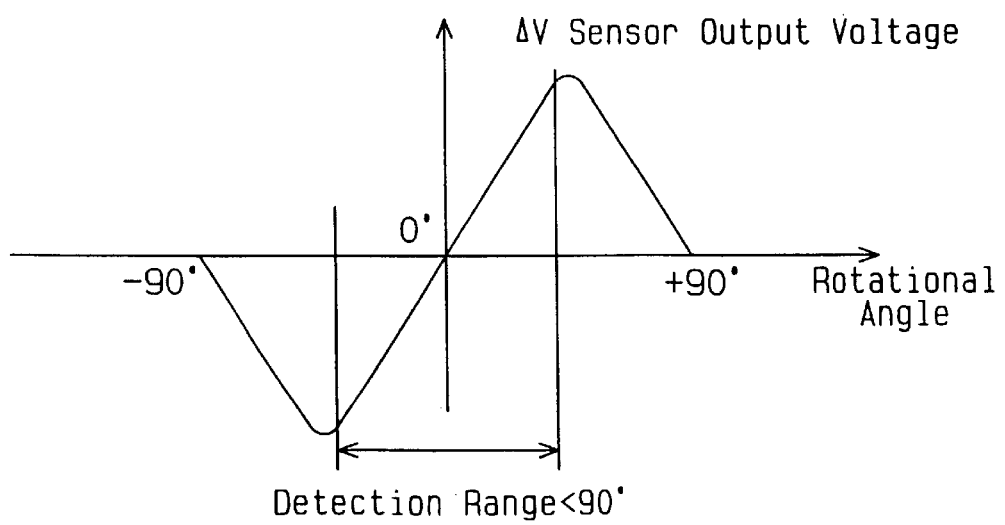
FIG. 3 is a graph showing the relationship between the output voltage of a magnetic resistance sensor and the rotational angle of a magnet in the rotational angle detector of FIG. 1.

In the drawings, like numerals are used for like elements throughout.

Figure 4A:
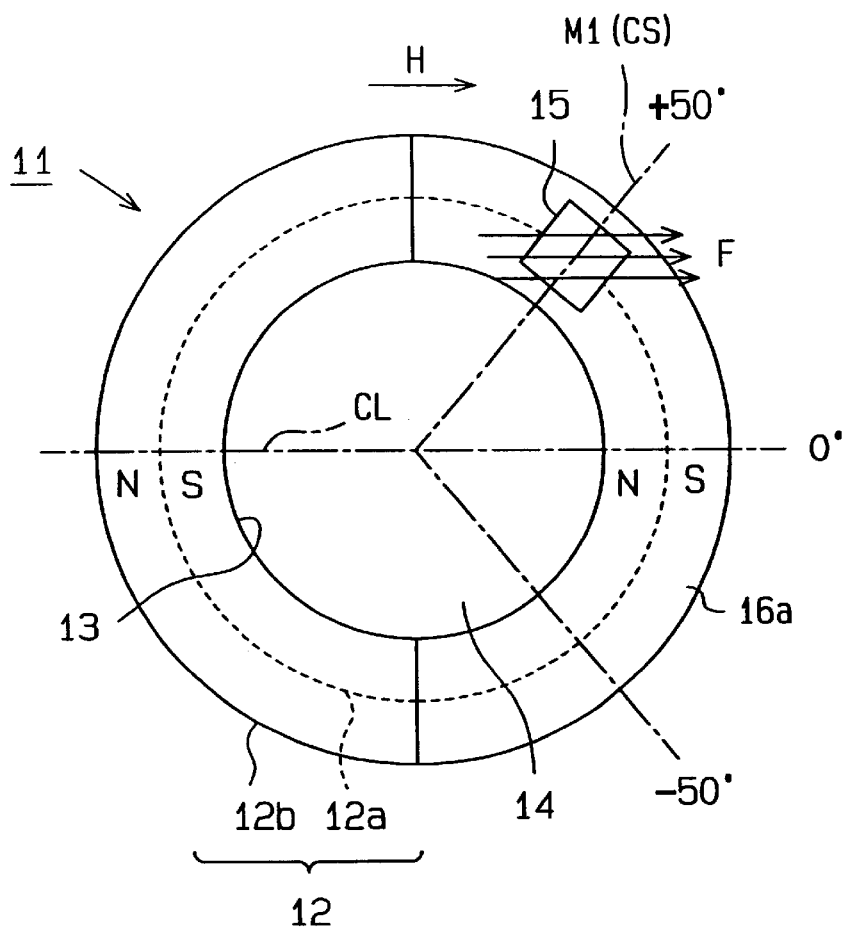
FIG. 4A is a schematic front view showing a rotational angle detector according to a first embodiment of the present invention.
Figure 5A:
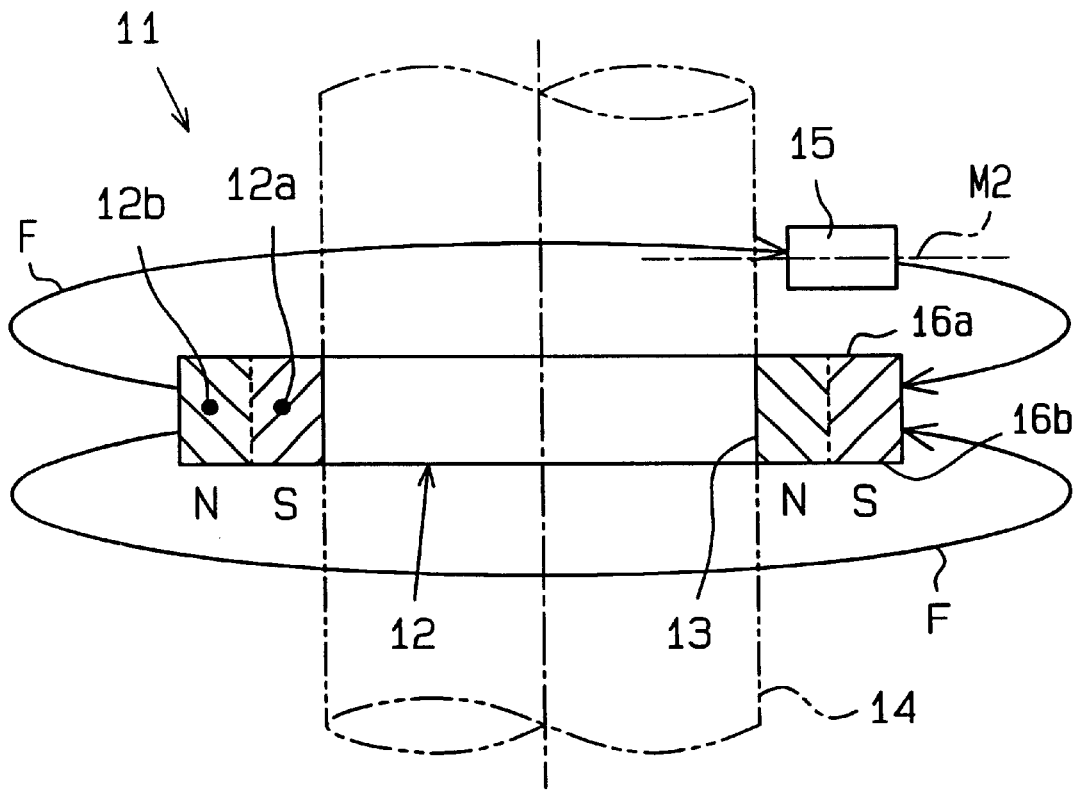
FIG. 5A is a cross-sectional view showing the rotational angle detector of FIG. 4A.

FIG. 4A is a schematic front view showing a rotational angle detector 11 according to a preferred embodiment of the present invention. The rotational angle detector 11 is arranged on a gearshift lever of an automobile to detect the position of the gearshift lever. FIG. 5A is a cross-sectional view showing the rotational angle detector 11.

The rotational angle detector 11 includes a magnet 12 magnetized in a predetermined direction, as shown by arrow H in FIG. 4A. The magnetization direction H is parallel to a center line CL.

The magnet 12 is annular and has a central hole 13. As shown by the broken lines of FIG. 5A, a shaft 14, which is rotated when shifting the gearshift lever (not shown), is inserted through the hole 13. The shift lever and the magnet 12 are rotated together with the shaft 14.

The magnet 12 is magnetized so that its magnetic flux F extends along the front surface 16a and rear surface 16b of the magnet 12. In other words, the magnet 12 is polarized in the horizontal direction as viewed in FIG. 5A. The magnetic flux F of the magnet 12 extends along the front and rear sides of the magnet 12 from the left side to the right side, as viewed in FIG. 5A. Further, the magnetic flux F on the front and rear surfaces of the magnet 12 are parallel and extend in the direction of arrow H in FIG. 4A.

FIG. 4A schematically shows the positional relationship between the north poles and the south poles of the magnet 12. The magnet 12 includes an annular first magnetic pole portion 12a and an annular second magnetic pole portion 12b, which extends about the first magnetic pole portion 12a. The first magnetic pole portion 12a is defined at the inner side of the magnet 12, and the second magnetic pole portion 12b is defined at the outer side of the magnet 12.

Half of the first magnetic pole portion 12a in the circumferential direction is polarized to the north pole, and the remaining half is polarized to the south pole. Half of the second magnetic pole portion 12b in the circumferential direction is polarized to the south pole, and the remaining half is polarized to the north pole. The south pole of the second magnetic pole portion 12b is located at the outer side of the north pole of the first magnetic pole portion 12a. The north pole of the second magnetic pole portion 12b is located at the outer side of the south pole of the first magnetic pole portion 12a. Referring to FIG. 5A, due to the positional relationship between the south and north poles in the magnetic pole portions 12a, 12b, the magnetic field (magnetic flux F) formed on the front surface 16a of the magnet 12 is parallel to that formed on the rear surface 16b of the magnet 12. FIG. 5A shows representative magnetic fluxes F.

A magnetic resistance sensor 15 is located above one side (front surface 16a) of the magnet 12, as viewed in FIG. 5A, at a position where the magnetic fluxes of the magnet 12 interlink. The magnetic resistance sensor 15 receives the magnetic flux F of the magnet 12 and generates a detection signal in accordance with the direction of the magnetic flux F. In the preferred embodiment, the magnetic resistance sensor 15 is arranged at a position spaced from the axis of the magnet 12. More specifically, the magnetic resistance sensor 15 is opposed to the magnet 12 at a position located substantially midway between the outer circumference and inner circumference of the magnet 12. In other words, the magnetic resistance sensor 15 is opposed to part of the magnet 12 at a location separated from the hole 13.

Figure 4B:
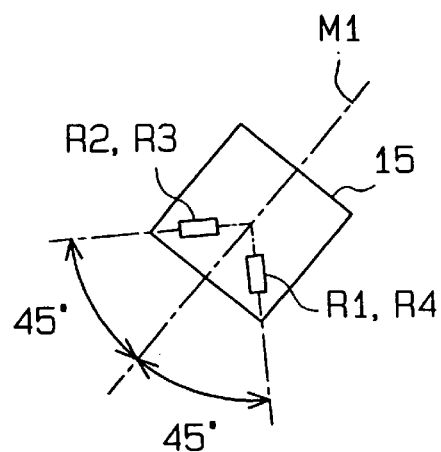
FIG. 4B is a front view showing a magnetic resistance sensor of the rotational detector of FIG. 4A.
Figure 5B:
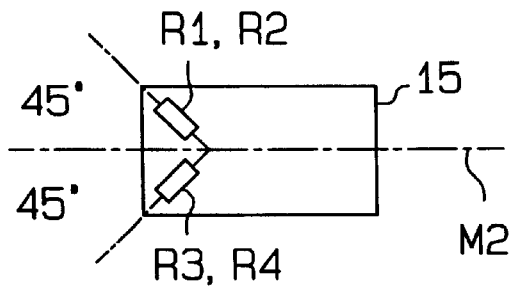
FIG. 5B is a side view showing the magnetic resistance sensor of the rotational angle detector of FIG. 4A.
Figure 7:
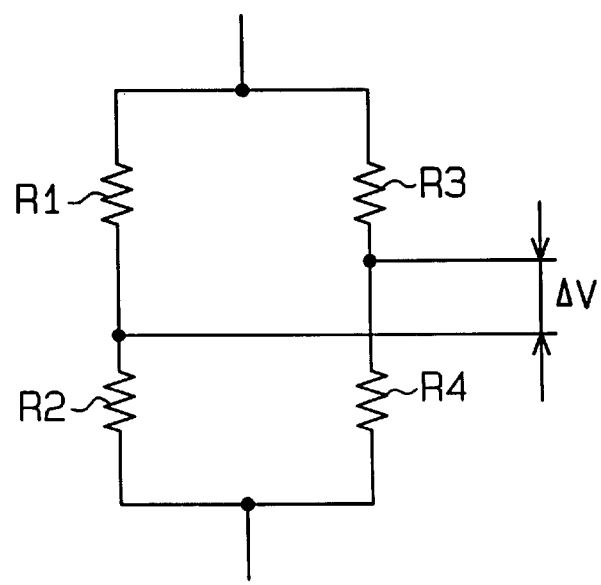
FIG. 7 is a circuit diagram of the magnetic resistance sensor.

With reference to FIG. 7, the magnetic resistance sensor 15 includes four magnetic resistance elements R1, R2, R3, R4 that are in full-bridged connection. The magnetic resistance elements R1–R4 are each ferromagnetic and made of, for example, Ni—Co. Referring to FIGS. 4B and 5B, the magnetic resistance elements R1–R4 are arranged at the side of the magnetic resistance sensor 15 that is closer to the inner circumference of the magnet 12. As shown in FIG. 4B, the magnetic resistance elements R2, R3 are arranged at an angle of 45° relative to a plane M1 extending radially from the shaft 14. The magnetic resistance elements R1, R4 are arranged in another direction at an angle of 45° relative to the plane M1. As shown in FIG. 5B, the magnetic resistance elements R1, R2 are arranged at an angle of 45° relative to a plane M2 extending perpendicular to the axis of the shaft 14. The magnetic resistance elements R3, R4 are arranged in another direction at an angle of 45° relative to the plane M2.

When the gearshift lever is shifted, the magnet 12 is rotated by a predetermined angle relative to the magnetic resistance sensor 15. This changes the direction of the interlinking magnetic fluxes F relative to the magnetic resistance sensor 15. The magnetic resistance sensor 15 generates an analog output voltage ΔV based on the change in the direction of the interlinking fluxes F. The output voltage ΔV is the differential voltage of the node potential between the resistance elements R1, R2 and the node potential between the resistance elements R3, R4.

Figure 6:
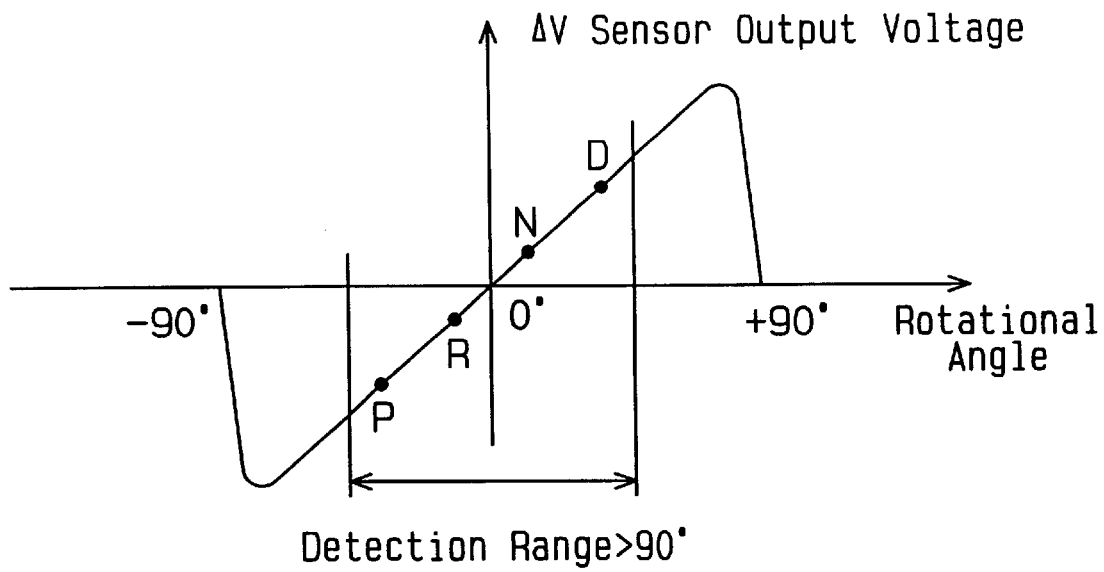
FIG. 6 is a graph showing the relationship between the output voltage of the magnetic resistance sensor and the rotational angle of a magnet in the rotational angle detector of FIG. 4A.

With reference to FIG. 6, the waveform of the analog output voltage ΔV relative to the rotational angle of the magnet 12 is substantially a sine wave. The linear portion of the output voltage waveform corresponds to the detection range of the gearshift lever rotational angle. Referring to FIG. 4A, the rotational angle of the gearshift lever is set to 0° when the middle of the north pole of the first magnetic pole portion 12a or the middle of the south pole of the second magnetic pole portion 12b is aligned with the middle of the magnetic resistance sensor 15. In other words, the rotational angle of the gearshift lever is set to 0° when the center line CL of the magnet 12 is aligned with a center line CS of the magnetic resistance sensor 15.

Referring to FIG. 6, the output voltage ΔV is detected at a range exceeding ±45° from rotational angle 0°. In other words, the detection range is greater than 90°. In FIG. 6, "P" indicates that the gearshift lever is in a parking position, "R" indicates that the gearshift lever is in a rear drive position, "N" indicates that the gearshift lever is in a neutral position, and "D" indicates that the gearshift lever is in a drive position.

The advantages of the rotational angle detector 11 of the preferred embodiment are discussed below.

(1) The magnet 12 of the rotational angle detector 11 is polarized in the horizontal direction. Thus, in comparison with the conventional magnet that is polarized in the vertical (axial) direction, the range in which the direction of the magnetic flux F of the magnet 12 relative to the magnetic resistance sensor 15 can be changed is greater. Accordingly, the sine wave showing the relationship between the output voltage ΔV of the magnetic resistance sensor 15 and the rotational angle of the magnet 12 is distorted, and an output voltage waveform having a long linear portion is obtained. As a result, the detection range of the magnetic resistance sensor 15 is enlarged.

(2) The magnetic resistance sensor 15 of the rotational angle detector 11 is located at a position spaced from the hole 13, which extends through the magnet 12. Thus, the magnetic resistance sensor 15 does not interfere with the shaft 14 that is inserted through the hole 13. This easily provides space for the magnetic resistance sensor 15 and facilitates the installation of magnetic resistance sensor 15.

(3) The first magnetic pole portion 12a and the second magnetic pole portion 12b are arranged about the axis of the magnet 12. Thus, the positional relationship between the north pole and the south pole does not change regardless of whether the magnet 12 is engaged with the shaft 14 from its rear side or front side. This prevents the magnet 12 from being installed in the wrong direction.

It should be apparent to those skilled in the art that the present invention may be embodied in many other specific forms without departing from the spirit or scope of the invention. Particularly, it should be understood that the present invention may be embodied in the following forms.

A casing made of a ferromagnet, such as steel, may cover the magnet 12. In this case, the casing reduces the influence of external magnetic fields on the magnet 12 and further stabilizes the detection of the rotational angle of the magnet 12.

The magnet 12 may be fixed, and the magnetic resistance sensor 15 may be rotated.

The magnetic resistance sensor 15 may be arranged proximate to the inner circumference or outer circumference of the magnet 12.

The magnetic resistance elements R1–R4 may be arranged on the side of the magnetic resistance sensor 15 that is closer to the outer circumference of the magnet 12.

The magnet 12 may have an arcuate form.

The present examples and embodiments are to be considered as illustrative and not restrictive, and the invention is not to be limited to the details given herein, but may be modified within the scope and equivalence of the appended claims.

What is claimed is:

1. A detector for detecting a rotational angle of a detected object, the detector comprising:

an annular magnet for forming a magnetic flux parallel to a predetermined radial direction of the magnet, wherein the magnet includes a first magnetic pole portion and a second magnetic pole portion located on the outer side of the first magnetic portion, the first magnetic pole portion having a semi-circular north pole and a semi-circular south pole, and the second magnetic pole portion having a semi-circular south pole located in correspondence with the north pole of the first magnetic pole portion and a semi-circular north pole located in correspondence with the south pole of the first magnetic pole portion;

a magnetic resistance sensor for generating a detection signal corresponding to the direction of the magnetic flux, wherein the detected object is connected to one of the magnet and the magnetic resistance sensor, and the magnet and the magnetic resistance sensor are rotated relatively to each other to generate the detection signal and obtain the rotational angle of the detected object, the magnetic resistance sensor being separated from an axis of rotation of one of the sensor and the magnet.

2. The detector according to claim 1, wherein the magnetic resistance sensor includes at least one ferromagnetic resistance sensing element having a central longitudinal axis, and said central longitudinal axis is at an angle to a plane defined by a top surface of said magnet.

3. The detector according to claim 2, wherein said angle is 45 degrees.

4. The detector according to claim 1, wherein the magnetic resistance sensor includes a plurality of ferromagnetic resistance sensing elements, each having a central longitudinal axis, and the central longitudinal axis of each element is at an angle to a plane defined by a top surface of said magnet.

5. The detector according to claim 4, wherein the central longitudinal axis of any resistance sensing element is not parallel to the central longitudinal axis of any other resistance sensing element.

* * * * *